United States Patent
Sai

(10) Patent No.: US 9,557,560 B2
(45) Date of Patent: Jan. 31, 2017

(54) MIRROR UNIT AND EXPOSURE APPARATUS

(71) Applicant: CANON KABUSHIKI KAISHA, Tokyo (JP)

(72) Inventor: Choshoku Sai, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 76 days.

(21) Appl. No.: 14/228,440

(22) Filed: Mar. 28, 2014

(65) Prior Publication Data

US 2014/0307243 A1 Oct. 16, 2014

(30) Foreign Application Priority Data

Apr. 16, 2013 (JP) .................. 2013-086060
Feb. 27, 2014 (JP) .................. 2014-037323

(51) Int. Cl.
*G03B 27/54* (2006.01)
*G02B 26/08* (2006.01)

(52) U.S. Cl.
CPC ................ *G02B 26/0825* (2013.01)

(58) Field of Classification Search
CPC .... G02B 26/0816; G02B 26/0825; G03F 7/20
See application file for complete search history.

(56) References Cited

U.S. PATENT DOCUMENTS

| | | | | |
|---|---|---|---|---|
| 4,655,563 A * | 4/1987 | Plante | ............... | G02B 26/06 359/849 |
| 6,989,922 B2 * | 1/2006 | Phillips | ............. | G02B 26/0825 359/196.1 |
| 7,708,415 B2 * | 5/2010 | Griffith | ............... | G02B 26/0858 359/846 |
| 7,837,341 B2 * | 11/2010 | Aoki | ................ | G02B 7/1822 250/215 |
| 7,907,326 B2 | 3/2011 | Uchida | | |
| 7,989,756 B2 * | 8/2011 | Koo | ................ | G02B 27/646 250/201.4 |
| 8,794,773 B2 * | 8/2014 | Camet | ............... | G02B 26/0825 359/846 |

(Continued)

FOREIGN PATENT DOCUMENTS

CN 101923214 A 12/2010
JP 2001208905 A 8/2001

(Continued)

OTHER PUBLICATIONS

Office Action issued in CN Application No. 201410145450.X issued on Nov. 23, 2015. English translation provided.

(Continued)

*Primary Examiner* — Deoram Persaud
(74) *Attorney, Agent, or Firm* — Rossi, Kimms & McDowell LLP

(57) ABSTRACT

A mirror unit includes: a mirror; a plurality of non-contact type actuators including movable elements and stators, and configured to change a shape of the mirror; a supporting plate to which the stators are fixed; and a structure configured to hold the mirror and the supporting plate. The movable elements are attached to a surface of the mirror that is opposite to an optical surface, and the structure holds the supporting plate via a kinematic mount.

9 Claims, 10 Drawing Sheets

(56) References Cited

U.S. PATENT DOCUMENTS

| | | | | |
|---|---|---|---|---|
| 2004/0017623 A1* | 1/2004 | Watson | ............... | G02B 7/182 |
| | | | | 359/849 |
| 2004/0027632 A1* | 2/2004 | Watson | ............... | G02B 7/1827 |
| | | | | 359/223.1 |
| 2006/0103956 A1* | 5/2006 | Griffith | ............... | G02B 26/06 |
| | | | | 359/845 |
| 2006/0232866 A1* | 10/2006 | Sai | ............... | G02B 26/0825 |
| | | | | 359/849 |
| 2006/0245035 A1* | 11/2006 | Uchida | ............... | G03F 7/70266 |
| | | | | 359/291 |
| 2007/0076310 A1* | 4/2007 | Sakino | ............... | G02B 7/183 |
| | | | | 359/819 |
| 2007/0286035 A1* | 12/2007 | Uchida | ............... | G02B 26/0825 |
| | | | | 369/44.14 |
| 2015/0092172 A1* | 4/2015 | Sai | ............... | G02B 26/0858 |
| | | | | 355/67 |
| 2015/0177481 A1* | 6/2015 | Sai | ............... | G03F 7/2008 |
| | | | | 355/67 |

FOREIGN PATENT DOCUMENTS

| | | |
|---|---|---|
| JP | 2004-064076 A | 2/2004 |
| JP | 4361269 B2 | 8/2009 |
| KR | 100842001 B1 | 6/2008 |
| WO | 02/12948 A2 | 2/2002 |

OTHER PUBLICATIONS

Office Action issued in Korean Patent Application No. 10-2014-0039224, mailed Oct. 25, 2016.

* cited by examiner

F I G. 2
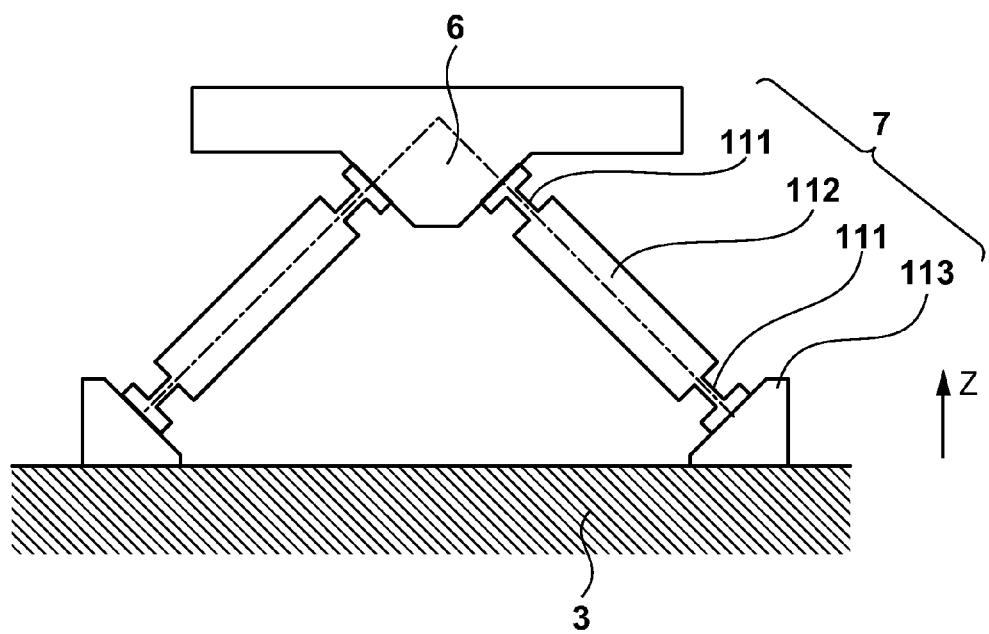

MIRROR UNIT AND EXPOSURE APPARATUS

BACKGROUND OF THE INVENTION

Field of the Invention

The present invention relates to a deformable mirror unit capable of correcting the wavefront error and distortion of an optical system in an exposure apparatus, astronomical telescope, or the like, and an exposure apparatus.

Description of the Related Art

Recently, as a demand on the resolution of an exposure apparatus is becoming stricter, a demand for correcting aberration induced by exposure is also becoming stricter. To correct aberration induced by exposure, there has been proposed an arrangement using a deformable mirror.

Japanese Patent No. 4361269 discloses a mirror support structure in which an outer ring supports a reaction assembly to which a pneumatic actuator for deforming a mirror is attached, and an inner ring supporting the mirror. Japanese Patent Laid-Open No. 2004-64076 discloses a servo control mechanism including many actuators which support a deformable mirror at least three rigid positions, and displacement sensors located near them.

In Japanese Patent No. 4361269, the pneumatic actuator is mechanically coupled to the rear surface of the mirror via a rod, and thus excessively constrained with respect to the mirror. The mirror shape is readily affected by an assembly error. In the mirror support structure disclosed in Japanese Patent No. 4361269, the reaction force of the pneumatic actuator is transferred to the mirror via the reaction assembly, inner ring, and outer ring, and may affect the mirror shape.

Japanese Patent Laid-Open No. 2004-64076 has proposed a mirror unit with a displacement feedback driving control system including many actuators and displacement sensors located near them. The mirror unit with the displacement feedback driving control system measures the displacement of the mirror at or near each driving point, and controls the actuators so that the displacement coincides with a target displacement value in a given accuracy range. Hence, the mirror unit is free from the influence of a driving reaction force. However, this mirror unit has a complicated arrangement, requires many displacement sensors, and is expensive.

SUMMARY OF THE INVENTION

The present invention provides a mirror unit which reduces the influence of a driving reaction force from an actuator on the mirror shape.

The present invention in its first aspect provides a mirror unit comprising: a mirror; a plurality of non-contact type actuators including movable elements and stators, and configured to change a shape of the mirror; a supporting plate to which the stators are fixed; and a structure configured to hold the mirror and the supporting plate, wherein the movable elements are attached to a surface of the mirror that is opposite to an optical surface, and the structure holds the supporting plate via a kinematic mount.

The present invention in its second aspect provides an exposure apparatus for projecting, onto a substrate via a projection optical system, a pattern image of a reticle illuminated with light from an illumination optical system, thereby exposing the substrate, wherein at least one of the illumination optical system and the projection optical system includes a mirror unit defined in the first aspect.

Further features of the present invention will become apparent from the following description of exemplary embodiments with reference to the attached drawings.

BRIEF DESCRIPTION OF THE DRAWINGS

FIG. 2 is a schematic view showing a bipod mount;

DESCRIPTION OF THE EMBODIMENTS

Embodiments of the present invention will now be described with reference to the accompanying drawings. A non-contact type actuator described in the present invention is of a type in which a movable element and stator are not mechanically coupled to each other in the actuator. The non-contact type actuator is, for example, a linear motor in which a movable element and stator are coupled by an electromagnetic force, or an electromagnet. Although the following embodiments set forth will exemplify a linear motor, the non-contact type actuator is not limited to only the linear motor.

<First Embodiment>

Figure 1A:
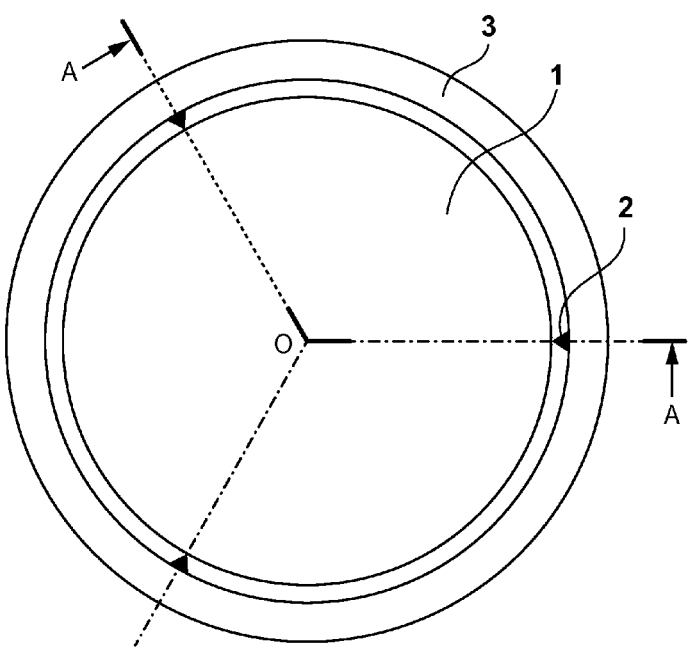
FIGS. 1A and 1B are views showing an arrangement according to the first embodiment.
Figure 1B:
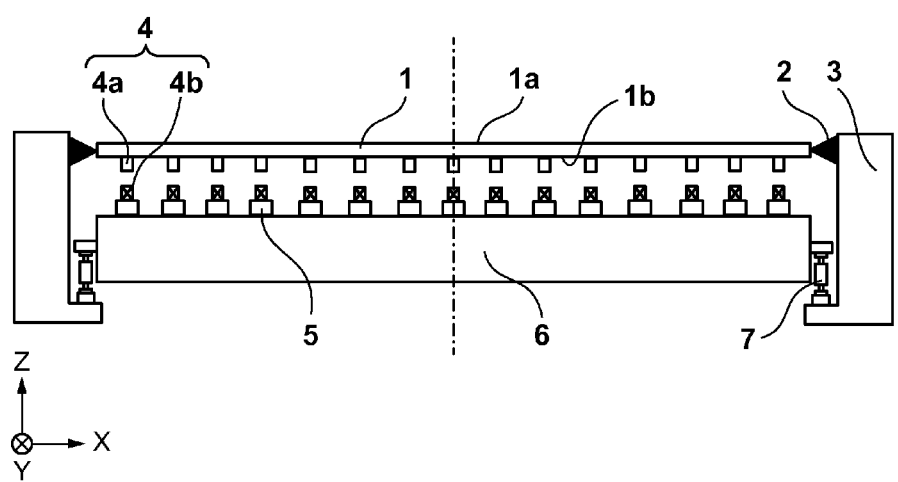

FIGS. 1A and 1B are views showing the arrangement of a mirror unit according to the first embodiment of the present invention. In FIG. 1B, the Z direction is the upward vertical direction. A mirror 1 having an optical surface 1a is held on its side surface by holding members 2. The holding members 2 are fixed to a structure 3. Movable elements (magnets) 4a of linear motors 4 are bonded and attached to a rear surface 1b of the mirror 1 that is a surface opposite to the optical surface. Supporting members 5 support stators (coils) 4b of the linear motors 4. The plurality of supporting members 5 are fixed to a supporting plate 6. It is also possible that the stators (coils) 4b are fixed on the supporting plate 6 directly. The supporting plate 6 receives a reaction force along with driving of the linear motors 4. The supporting plate 6 is kinematically held with respect to the structure 3 by bipod mounts 7 (kinematic mounts) located at three portions. The bipod mounts 7 are located at an interval of 120° in the rotational direction along the periphery of the mirror 1. In the first embodiment, the structure 3 constitutes a lens barrel which surrounds the mirror 1, the plurality of linear motors 4, and the supporting plate.

In the first embodiment, the movable element 4a is directly bonded to the rear surface 1b of the mirror 1. However, the movable element 4a may be bonded to the rear surface 1s of the mirror 1 via a member which relaxes a heat stress. When the difference between the linear expansion coefficient of the mirror 1 and that of the movable element 4a is large, the use of the member which relaxes a heat stress is effective in relaxing a heat stress. In general, the linear expansion coefficient of the mirror 1 is smaller than that of the movable element 4a. As the member which relaxes a heat stress, the same material as that of the mirror 1, a material having physical property values close to those of the material of the mirror 1, or a material smaller in linear expansion coefficient than at least the movable element 4a is used.

FIG. 2 is a schematic view showing the bipod mount 7 in FIG. 1B.

FIG. 2 is a schematic view showing the bipod mount 7. The supporting plate 6 and the structure 3 are coupled by flexures 111 which operate similarly to ball joints, a rigid bar 112, and a fixing member 113. Three bipod mounts 7 of this type are used and can fix the supporting plate 6 to the structure 3 kinematically in the range of a small displacement.

Since the supporting plate 6 is kinematically fixed to the structure 3, it can be prevented to deform the structure 3 upon transferring, to the structure 3, the deformation of the supporting plate 6 caused by a driving reaction force upon driving the linear motor 4 to deform the mirror 1. Hence, the shape of the mirror 1 can be deformed at high accuracy without deforming the mirror 1 by the driving reaction force of the linear motor 4 via the structure 3 and holding member 2.

This is effective particularly in a mirror unit which deforms the mirror 1 by only high-accuracy force control using a non-contact type actuator such as the linear motor 4. In the mirror unit which controls the shape of the mirror 1 by only the non-contact type actuator, the accuracy of the shape of the mirror 1 depends not only on the force accuracy but also on each factor affecting the mirror shape. For example, if the driving reaction force for deforming the mirror 1 affects the mirror shape via the structure 3, this directly leads to poor accuracy of the shape of the mirror 1.

As the holding members 2 of the mirror 1, in FIG. 1B, the holding members 2 may be held kinematically using the aforementioned bipod mounts 7. However, the holding members 2 of the mirror may be holding members other than the kinematic mounts. For example, the mirror 1 may be fixed to the structure 3 by bonding or clamped mechanically.

<Second Embodiment>

Figure 3:
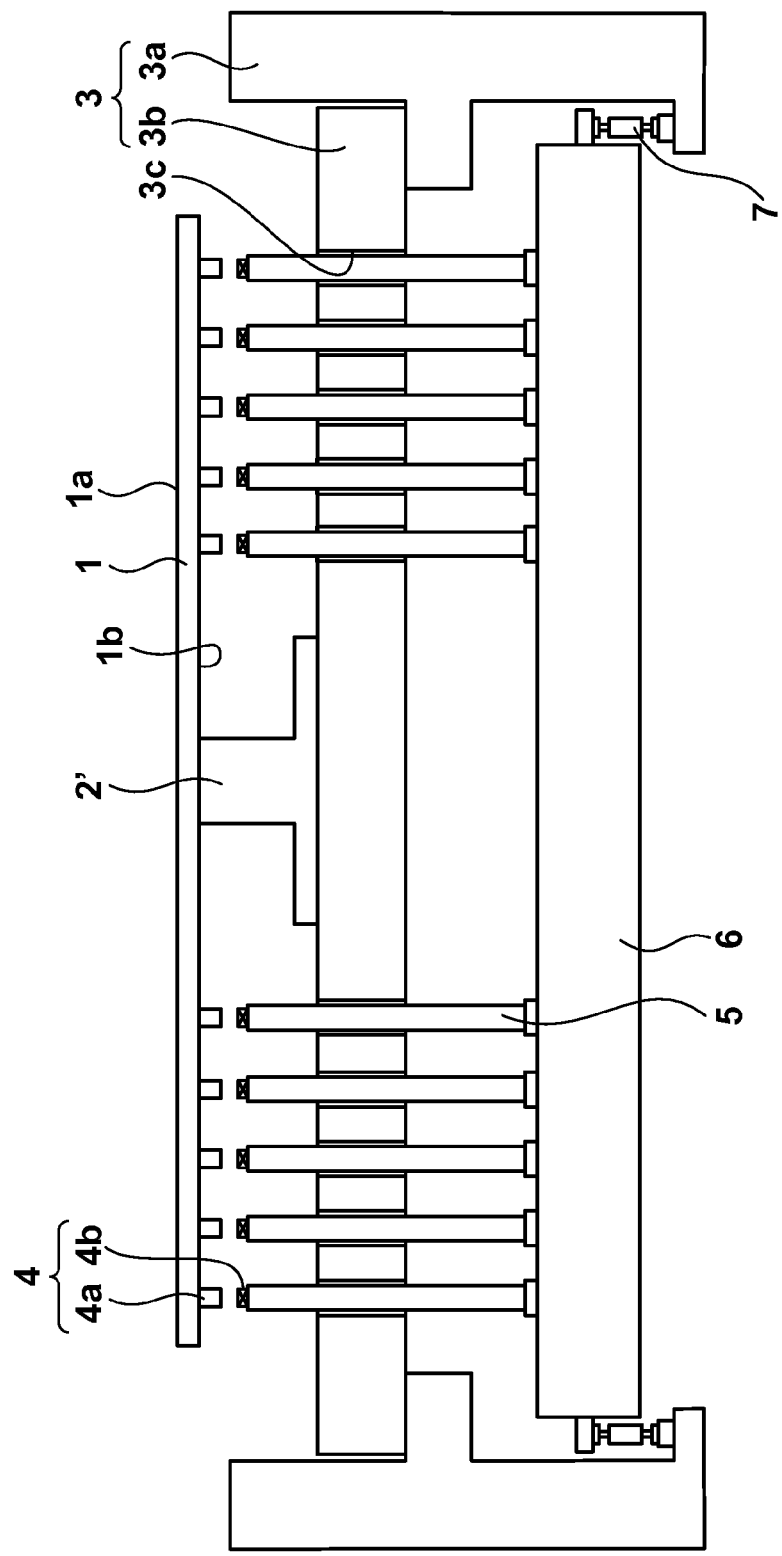
FIG. 3 is a view showing an arrangement according to the second embodiment.

FIG. 3 shows the second embodiment of the present invention. A mirror 1 having an optical surface 1a is fixed to a plate-shaped second structure 3b serving as part of a structure 3 by a holding member 2' which holds the center portion of a rear surface 1b of the mirror 1. In the second embodiment, the structure 3 is constituted by a first structure 3a which constitutes a lens barrel, and the plate-shaped second structure 3b.

The second structure 3b is fixed to the first structure 3a. Movable elements (magnets) 4a of linear motors 4 are bonded to a rear surface 1b of the mirror 1 except for the center portion. Stators (coils) 4b are fixed to a supporting plate 6 via supporting members 5. The supporting members 5 extend through through holes 3c formed in the second structure 3b, and are fixed to the supporting plate 6 located below the second structure 3b. The supporting plate 6 is coupled to the first structure 3a at three portions via bipod mounts 7. Similar to the first embodiment, even in the second embodiment, the influence of the driving reaction force of the linear motor 4 on the shape of the mirror 1 is blocked.

Figure 4:
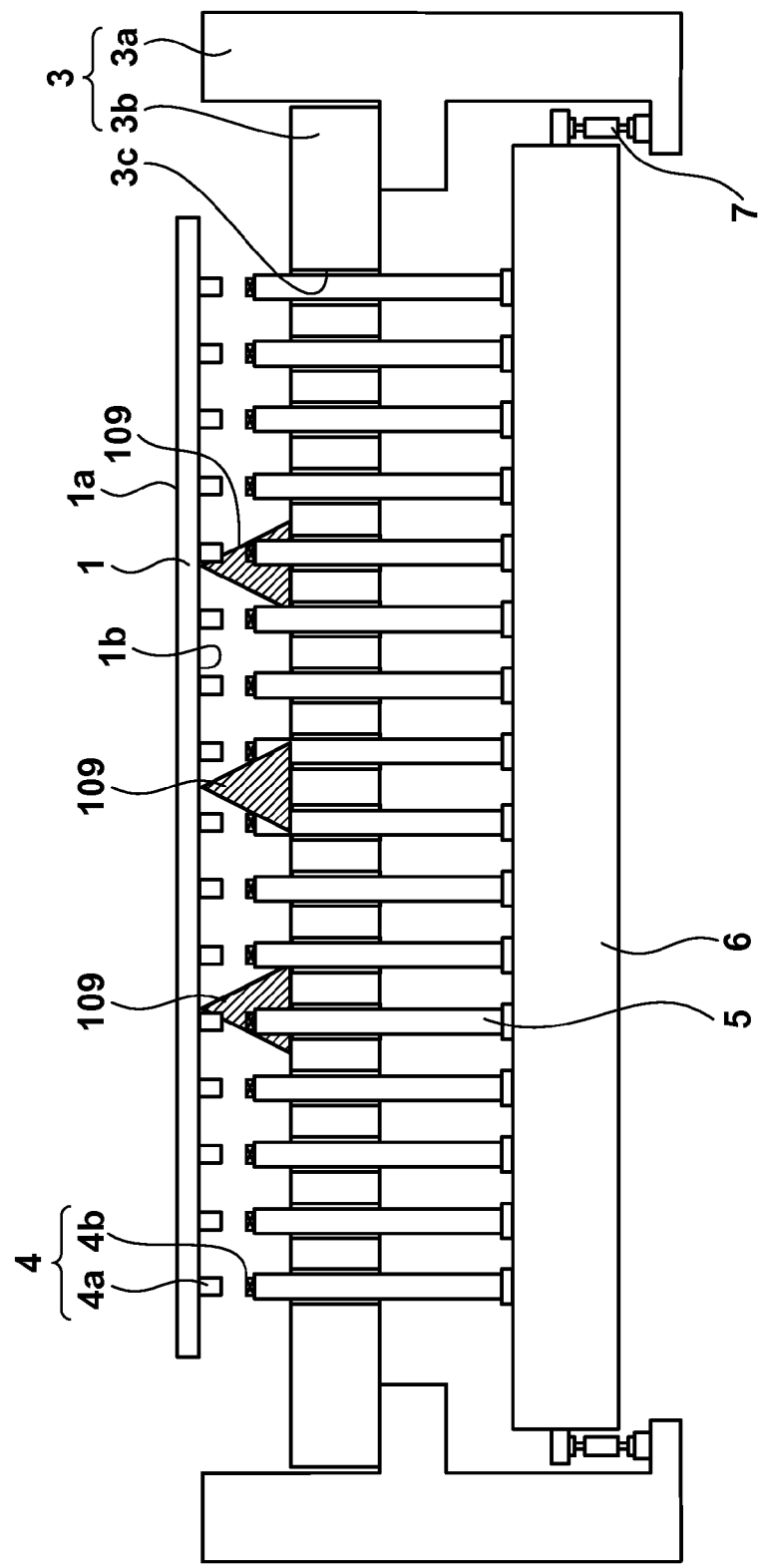
FIG. 4 is a view showing a modification of the second embodiment.
Figure 5:
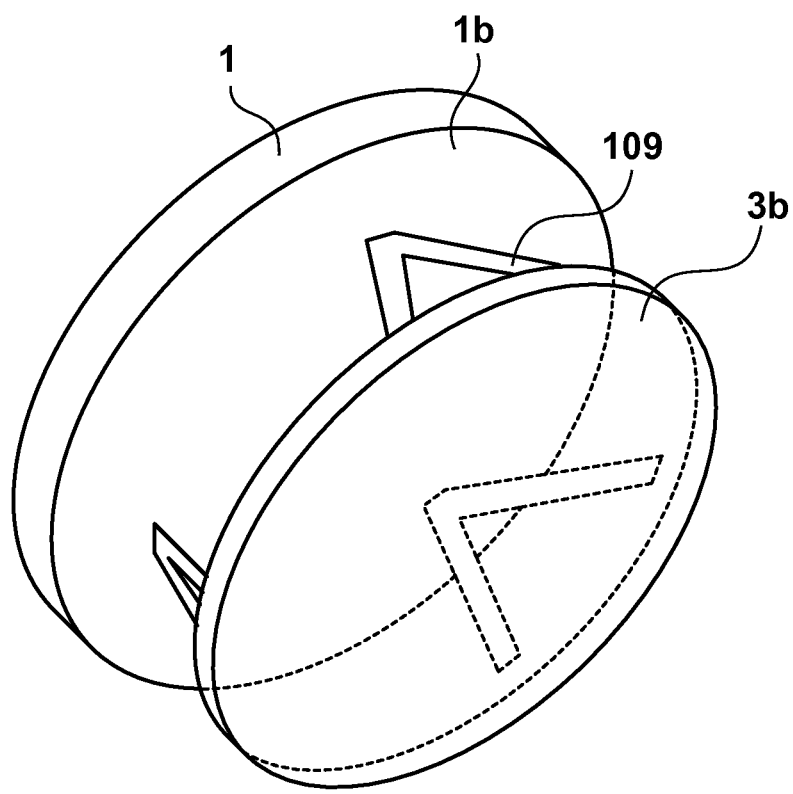
FIG. 5 is a view showing a state in which a mirror in FIG. 4 is held.

FIG. 4 shows a modification of the second embodiment. The arrangement in FIG. 4 is different from that in FIG. 3 in that at least three holding members 109 are used to hold the rear surface 1b of the mirror 1. FIG. 5 shows the arrangement of the holding members 109 which couple the rear surface 1b of the mirror 1 and the second structure 3b.

<Third Embodiment>

Figure 6:
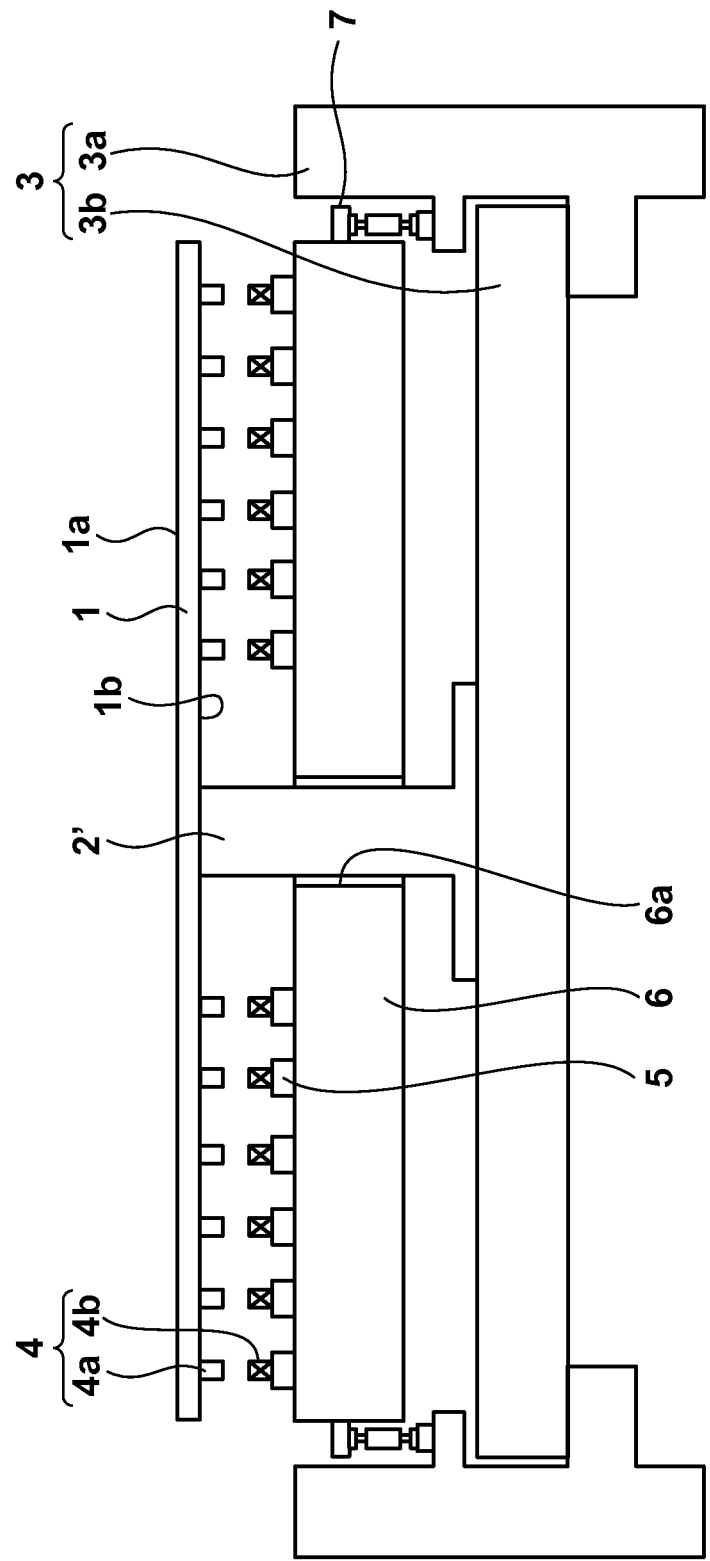
FIG. 6 is a view showing an arrangement according to the third embodiment.

FIG. 6 shows the third embodiment of the present invention. A mirror 1 having an optical surface 1a is held by a holding member 2' at the center portion of a rear surface 1b. The holding member 2' extends through a through hole 6a formed in a supporting plate 6 and is fixed to a second structure 3b located below the holding member 2. Movable elements (magnets) 4a of linear motors 4 are bonded to the rear surface 1b of the mirror 1 except for the center portion. Stators (coils) 4b are fixed to the supporting plate 6 via supporting members 5. The supporting plate 6 is coupled to a first structure 3a via bipod mounts 7.

Similar to the first embodiment, even in the third embodiment, the influence of the driving reaction force of the linear motor 4 on the shape of the mirror 1 is blocked.

Figure 7:
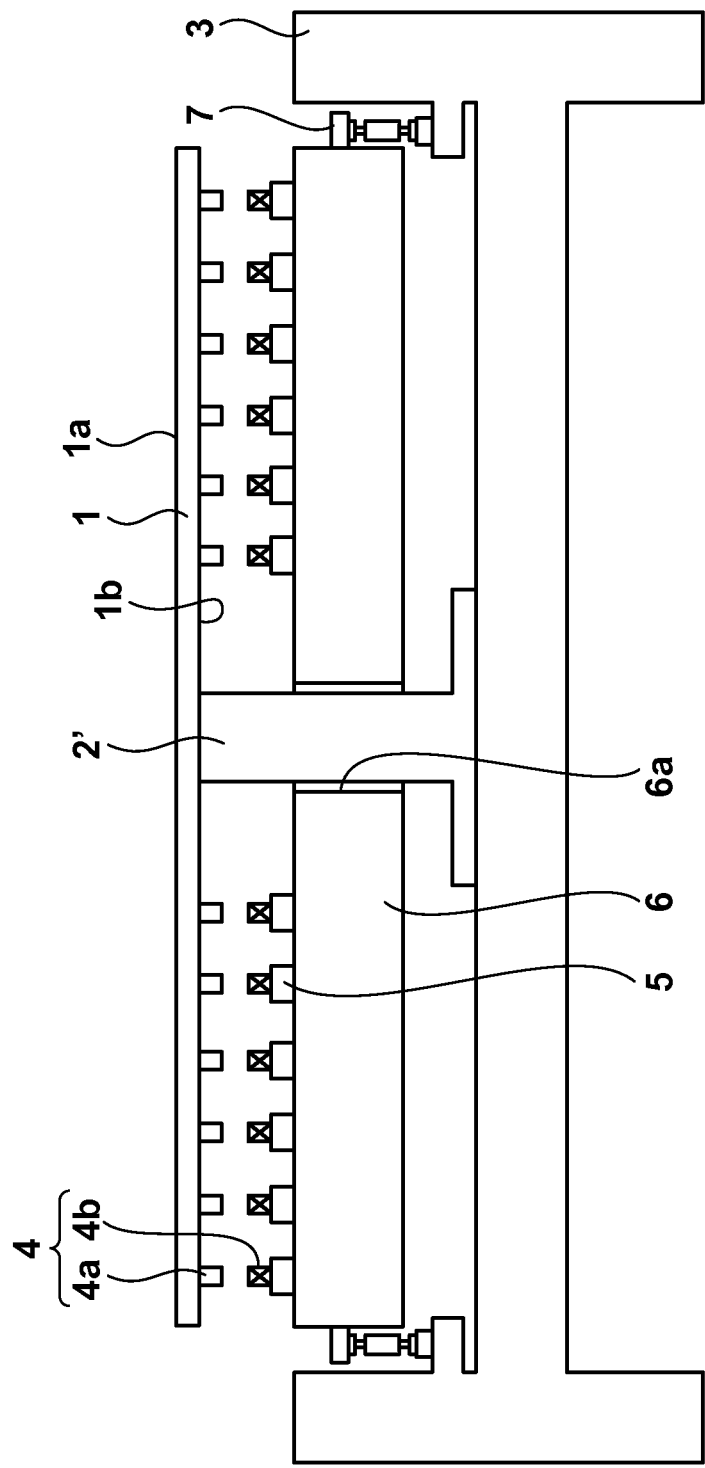
FIG. 7 is a view showing a modification of the third embodiment.

FIG. 7 shows a modification of the third embodiment. The arrangement in FIG. 7 is different from that in FIG. 6 in that the first structure 3a and second structure 3b are integrally formed. The structure 3 described in each of the second and third embodiments is divided into two structures, but the present invention is not limited to this. In practice, the structure 3 may be constituted by one or more members.

<Fourth Embodiment>

Figure 8:
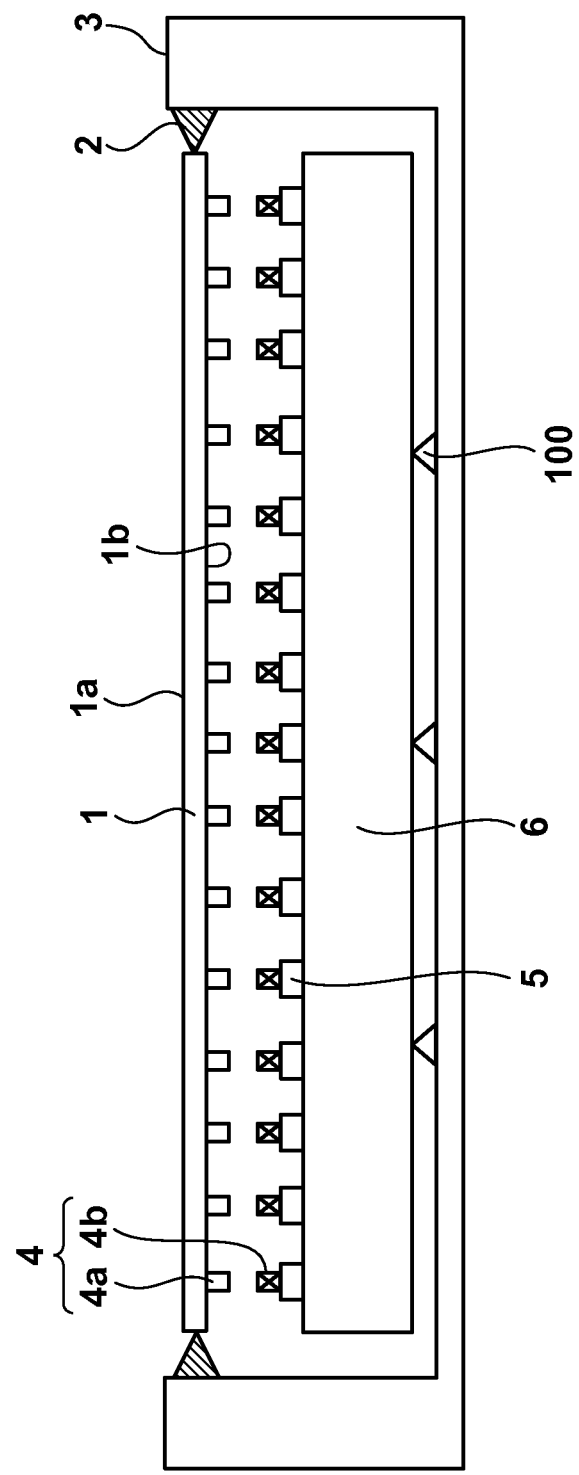
FIG. 8 is a view showing an arrangement according to the fourth embodiment.
Figure 9:
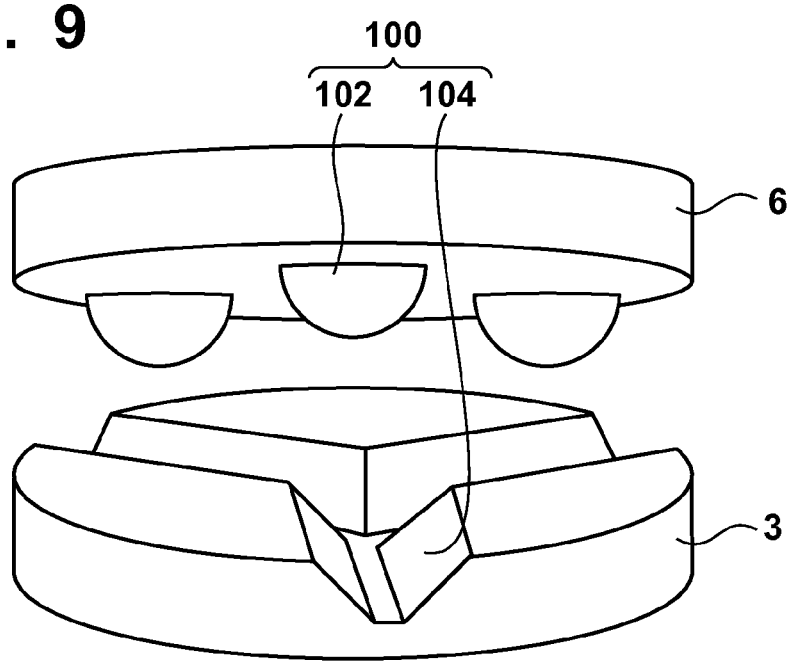
FIG. 9 is a schematic view showing a mount using a ball and V-groove.

FIG. 8 is a view showing the arrangement of a mirror unit according to the fourth embodiment of the present invention. FIG. 9 is a schematic view showing three V-groove mounts 100 constituted by three V-grooves 104 and three balls 102. The bails 102 fixed to a supporting plate 6 are coupled to the V-grooves 104 formed in a structure 3 to couple the supporting plate 6 and structure 3 without excessively constraining them. The supporting plate 6 is thus held kinematically with respect to the structure 3. When this type of mount is used, the deformation of the structure 3 is not transferred to the supporting plate 6 in a frictionless ideal state. In practice, the accuracy of the kinematic mount of this type is decided by the influence of the shape error of the ball 102, the shape error and position error of the V-groove 104, the friction between the ball 102 and the V-groove 104, and the like.

In the example Of FIG. 9, the coupling between the V-groove 104 and the ball 102 constraints two degrees of freedom at two points at which the groove 104 and ball 102 point-contact each other. Since the three V-groove mounts 100 are used, the supporting plate 6 is constrained at six degrees of freedom with respect to the structure 3. The V-groove mount 100 has high positioning reproducibility because, even if work of separating the supporting plate 6 and structure 3 and then recoupling them is repeated, the V-groove 104 and ball 102 are always coupled at the same position. Since the V-groove 104 and ball 102 point-contact each other, the force is transferred from the V-groove 104 to the ball 102 or reversely from the ball 102 to the V-groove 104. However, a moment greatly concerning deformation is not transferred.

In a mount using a leaf spring or hinge, the rigidity is not zero at a low-rigidity portion of the leaf spring, the hinge portion, or the like serving as the point-contact portion between the V-groove 104 and the ball 102, and not only the force but also the moment is transferred. According to the fourth embodiment, the transfer of deformation can be blocked much more than in the case in which the leaf spring or hinge is used.

Figure 10:
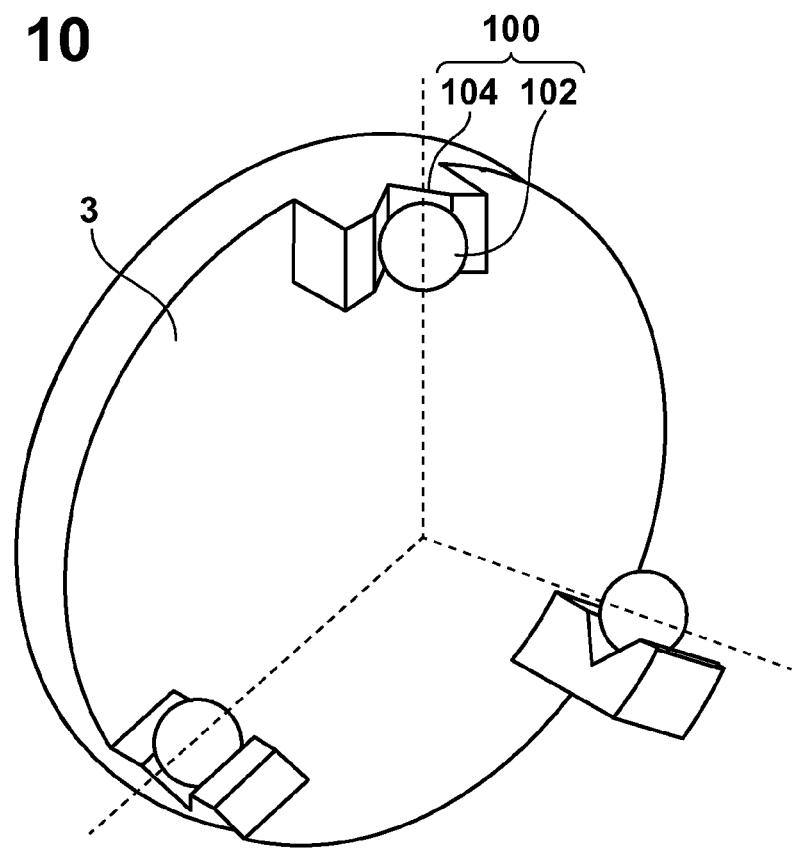
FIG. 10 is a view showing an example of a mount in a vertical mirror unit.

Although the optical axis of the mirror 1 is oriented in the vertical direction in the first to fourth embodiments, the orientation of the mirror 1 is not limited to this. Even when the optical axis of the mirror 1 is oriented in an arbitrary direction, the mirror unit according to the present invention is applicable. For example, when the optical axis of the mirror 1 is oriented in the horizontal direction, the mirror unit is rotated by 90°. In this case, the three V-groove mounts 100 in FIG. 9 may he formed vertically, or V-groove mounts 100 as shown in FIG. 10 are also available. The vertical V-groove mounts 100 in FIG. 10 are constituted by V-grooves 104 formed in the structure 3, and balls 102 which are coupled to the V-grooves 104. The balls 102 are fixed to the supporting plate 6 (not shown). Although the bipod mounts 7 as shown in FIG. 2 can he employed, the arrangement can be changed in accordance with a concrete design. The present invention has exemplified well-known two types of mounts, but is not limited to them. If necessary, the supporting plate 6, structure 3, or the like may have a cooling function.

[Exposure Apparatus]

Figure 11:
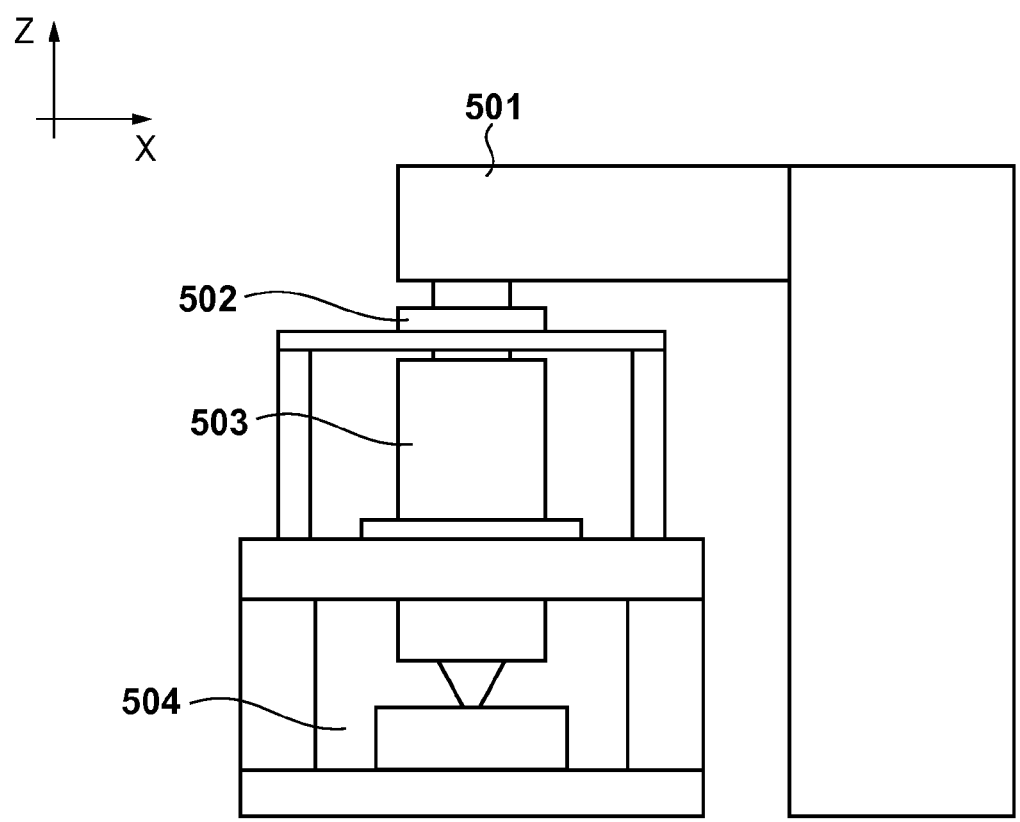
FIG. 11 is a view showing the arrangement of an exposure apparatus.

An exemplary exposure apparatus to which the mirror unit according to the present invention is applied will be explained. As shown in FIG. 11, the exposure apparatus includes an illumination optical system 501, a reticle stage 502 on which a reticle is mounted, a projection optical system 503, and a substrate stage 504 on which a substrate is mounted. The exposure apparatus projects, onto a substrate via the projection optical system 503, the pattern image of a reticle illuminated with light from the illumination optical system 501, thereby exposing the substrate. The exposure apparatus may comply with a step & repeat projection exposure method or a step & scan projection exposure method. The mirror unit according to the present invention can be used as a mirror unit for correcting the wavefront error and distortion of at least one of the illumination optical system 501 and projection optical system 503.

The mirror unit according to the present invention can also be used as a mirror unit for correcting the wavefront error and distortion of an optical system in an astronomical telescope other than the exposure apparatus.

[Method of Manufacturing Device]

Next, a method of manufacturing a device (for example, a semiconductor device or liquid crystal display device) will be explained. The semiconductor device is manufactured through a pre-process of forming an integrated circuit on a wafer, and a post-process of completing, as a product, an integrated circuit chip formed on the wafer by the pre-process. The pre-process includes a step of exposing a wafer coated with a photosensitive agent by using the above-mentioned exposure apparatus, and a step of developing the wafer. The post-process includes an assembly step (dicing and bonding) and a packaging step (encapsulation). The liquid crystal display device is manufactured through a process of forming a transparent electrode. The process of forming a transparent electrode includes a step of applying a photosensitive agent to a glass substrate on which a transparent conductive film is deposited, a step of exposing the glass substrate coated with the photosensitive agent by using the above-described exposure apparatus, and a step of developing the glass substrate. According to the method of manufacturing a device in the embodiment, a higher-quality device than a conventional one can he manufactured.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefits of Japanese Patent Application Nos. 2013-086060, filed Apr. 16, 2013 and 2014-037323, filed Feb. 27, 2014, which are hereby incorporated by reference herein in their entirety.

What is claimed is:

1. A mirror unit comprising:
    a mirror;
    a plurality of non-contact type actuators including movable elements and stators, and configured to change a shape of said mirror;
    a supporting plate to which the stators are fixed;
    a kinematic mount contacting the supporting plate;
    a holding member contacting and holding the mirror, without contacting the supporting plate; and
    a structure configured to hold:
        the holding member; and
        said supporting plate via the kinematic mount,
    wherein the movable elements are attached to a surface of said mirror that is opposite to an optical surface thereof.

2. The mirror unit according to claim 1, wherein said structure includes a lens barrel surrounding said plurality of actuators, said mirror, and said supporting plate.

3. The mirror unit according to claim 2, wherein:
    said structure includes a first structure that holds said supporting plate via the kinematic mount, and a plate-shaped second structure that holds, via the holding member, the surface of said mirror that is opposite to the optical surface,
    the first structure constitutes the lens barrel, and
    the second structure is fixed to the first structure or formed integrally with the first structure.

4. The mirror unit according to claim 3, wherein:
    said supporting plate is disposed sandwiched between said mirror and the second structure in an optical axis direction of said mirror,
    said supporting plate includes a through hole, and
    the holding member extends through the through hole.

5. The mirror unit according to claim 3, wherein:
    the second structure is disposed sandwiched between said holding member and said supporting plate in an optical axis direction of said mirror,
    the stators are fixed to the supporting plate via a plurality of supporting members that support the stators, and
    the second structure includes a plurality of through holes, and the plurality of supporting members extend through the plurality of through holes.

6. The mirror unit according to claim 5, wherein the second structure holds said mirrors using at least three holding members.

7. The mirror unit according to claim 1, wherein said structure holds a side surface of said supporting plate.

8. The mirror unit according to claim 1, wherein said structure holds a side surface of said mirror.

9. An exposure apparatus for projecting a pattern image of a reticle onto a substrate to expose the substrate, the exposure apparatus comprising:
    an illumination optical system configured to illuminate light; and
    a projection optical system configured to project the light from the illumination optical system to the substrate, wherein at least one of the illumination optical system or the projection optical system includes a mirror unit, wherein the mirror unit includes:
- a mirror;
- a plurality of non-contact type actuators including movable elements and stators, and configured to change a shape of the mirror;
- a supporting plate to which the stators are fixed;
- a kinematic mount contacting the supporting plate; and
- a holding member contacting and holding the mirror, without contacting the supporting plate; and
- a structure configured to hold:
  - the holding member; and
  - the supporting plate via the kinematic mount, wherein the movable elements are attached to a surface of the mirror that is opposite to an optical surface thereof.

* * * * *